United States Patent [19]

Russell

[11] 4,417,315
[45] Nov. 22, 1983

[54] METHOD AND APPARATUS FOR INCREMENTING A DIGITAL WORD

[75] Inventor: Jeffrey D. Russell, Cedar Rapids, Iowa

[73] Assignee: Rockwell International Corporation, El Segundo, Calif.

[21] Appl. No.: 283,305

[22] Filed: Jul. 14, 1981

[51] Int. Cl.³ .............................................. G06F 7/50
[52] U.S. Cl. .................................................. 364/770
[58] Field of Search ...................... 364/770; 307/472; 377/126

[56] References Cited

U.S. PATENT DOCUMENTS

| | | | |
|---|---|---|---|
| 3,989,940 | 11/1976 | Kihara ................................... | 364/770 |
| 4,052,604 | 10/1977 | Maitland et al. ................. | 364/770 X |
| 4,054,788 | 10/1977 | Maitland et al. ................. | 364/770 X |
| 4,153,939 | 5/1979 | Kudov ................................... | 364/770 |
| 4,218,750 | 8/1980 | Carter et al. ......................... | 364/770 |
| 4,280,190 | 7/1981 | Smith .................................... | 364/770 |

OTHER PUBLICATIONS

Elliott, "Increment-Decrement Logic", *IBM Tech. Disclosure Bulletin*, vol. 11, No. 3, Aug. 1968, pp. 297-298.

*Primary Examiner*—David H. Malzahn
*Attorney, Agent, or Firm*—Bruce C. Lutz; Howard R. Greenberg; H. Frederick Hamann

[57] ABSTRACT

A circuit is presented designed specifically for use in complementary symmetry design techniques such as CMOS/SOS wherein inverting gate types are a preferred design. This design is obtained with a minimum of delay by changing gate types in the ripple carry path wherein alternating stages utilize NAND gates with the remaining ripple carry path stages using NOR gates. To accomplish this approach, the bit stages of the word utilizing the NOR gates must have the bits inverted before being applied to the incrementing circuit.

9 Claims, 3 Drawing Figures

METHOD AND APPARATUS FOR INCREMENTING A DIGITAL WORD

INVENTION

The present invention is concerned generally with electronics and more specifically with digital circuits. Even more specifically, the present invention is concerned with incrementing a digital word using a minimum number of components and thus occupying a minimum area on an integrated circuit chip for the circuit function.

An incrementer is a device that "adds one to" an operand. In the case of digital design techniques, the operand is the binary word which is to be incremented by one binary bit. In the prior art, the immediately obvious solution is to use AND gates in the ripple carry path and exclusive OR gates in the SUM path whereby the SUM for any individual stage is the exclusive OR (XOR) combination of the bit for that binary position in the word and the carry input. The carry output is provided when both the carry in and the bit value for that bit position in the word are logic ones. An appropriate number of such stages may be connected in series to form an arbitrary word bit length incrementer.

In most integrated circuit technologies, it has been determined that inverting gate types are preferred for the construction process. Thus, the AND gate is not ideal for fabrication. Normally, this is solved by replacing an AND gate with a NAND gate followed by an inverter. However, this creates a problem in that there are two gate delays per data bit stage in the ripple carry path. When there are a large number of stages or bit positions (the word to be incremented is large) the ripple path time delay is of great concern.

This time delay has been minimized in the present invention by alternately utilizing NAND and NOR gates in the ripple carry path by the expedient of inverting the bits being received in the stages utilizing NOR gates. Since the inverter is in the parallel path rather than the ripple carry path, the inverted time delay does not significantly affect total speed. However, the total time required for the binary word to be incremented is significantly lessened.

It is therefore an object of the present invention to provide an improved approach to incrementing a binary word.

Other objects and advantages of the present inventive concept may be ascertained from a reading of the specification and appended claims in conjunction with the drawings wherein:

DETAILED DESCRIPTION

Figure 1:
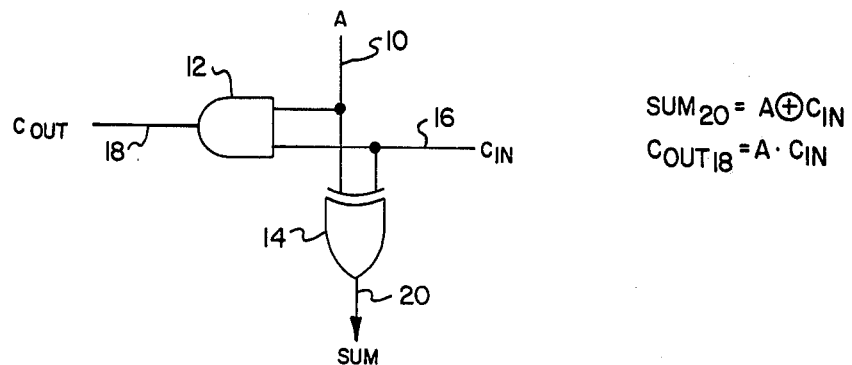
FIG. 1 illustrates a incrementer stage in the prior art.

In FIG. 1 an A input 10 provides a logic bit to be incremented to one input of a AND gate 12 and to one input of an exclusive OR gate 14. A $C_{IN}$ or carry input 16 provides a second input to each of AND gate 12 and exclusive OR gate 14. An output of AND gate 12 is designated as 18 or as carry output while an output of exclusive OR gate 14 is designated 20 which is the SUM output. To the right of this FIG. there is the formula that the SUM output on lead 20 equals A logically combined in an exclusive OR manner with $C_{IN}$ and a second formula that $C_{OUT}$ on 18 equals the input A logically combined in an AND manner with a $C_{IN}$.

Figure 2:
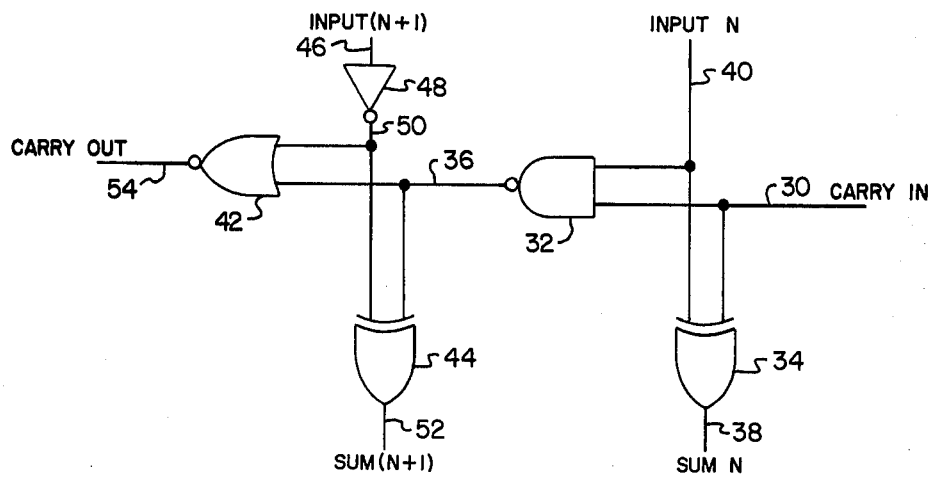
FIG 2 illustrates a circuit for incrementing two stages of a binary word as proposed by the present inventive concept.

In FIG. 2 a carry in lead 30 supplies signals to a NAND gate 32 and an exclusive OR gate 34 whose outputs respectively are labeled 36 and 38. An N stage data bit input in lead 40 also supplies input signals to the NAND gate 32 and the exclusive OR gate 34. The lead 36 provides carry signals to a NOR gate 42 and a second exclusive OR gate 44. An input lead 46 supplies logic bits from the next bit position of a word and is illustrated as input (N+1) to an inverter 48. An output of inverter 48 is supplied on lead 50 to NOR gate 42 and exclusive OR gate 44. An output of gate 44 is supplied on a lead 52 as the SUM signal for the (N+1) data bit position. A carry output signal is provided on lead 54 from NOR gate 42 as the carry out for the second stage portion of the incrementing circuit.

Figure 3:
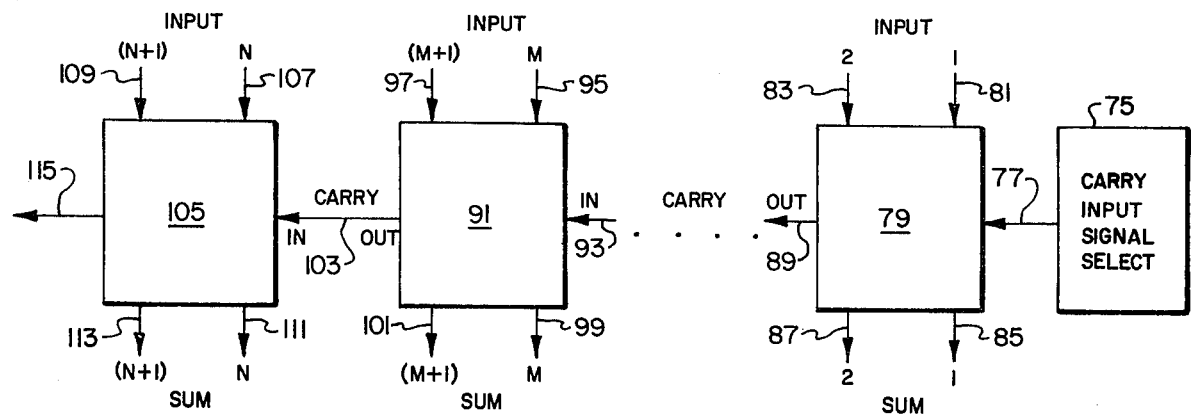
FIG. 3 is a block diagram connecting the circuits illustrated in FIG. 2.

In FIG. 3 a carry input signal select circuit 75 supplies signals on a lead 77 to a block 79 which includes the contents of FIG. 2. Leads 81 and 83 provide signals representing data bit positions 1 and 2 as inputs while leads 85 and 87 provide SUM output signals for data bit positions 1 and 2. A carry output lead 89 provides output signals to the next stage. Dots are illustrated between block 79 and a further block 91 to indicate that a plurality of stages of incrementation may be provided. A carry in lead 93 is shown supplying carry signals from the next previous stage. Further, block 91 has inputs 95 and 97 providing logic bit signals from data bit positions M and (M+1) in the word to be incremented and also includes leads 99 and 101 for providing SUM output signals for bit positions M and (M+1). Block 91 also provides a carry out signal on lead 103 to the final stage illustrated as block 105 having N and (N+1) input leads 107 and 109 respectively. Block 105 also has SUM output leads N and (N+1) designated as 111 and 113 respectively. Finally, a overflow indication (or carry output for double precision numbers) is designated as 115.

OPERATION

While the increment function can be obtained from a full-adder stage, there are occasions which an incrementer is used as a separate function for incrementing a word in memory or for use in conjunction with a register so as to mechanize a counter.

As previously indicated, prior art pproaches to performing increment functions involved circuitry which was hard to implement using CMOS integrated circuit techniques or introduced unmanageable time delays in the series operating circuit where speed of operation of the state machine was vital.

Referring first to the prior art of FIG. 1, it will be noted that with every stage identical, it is very obvious that the SUM for the incrementer as shown on the right hand portion of FIG. 1 is the exclusive OR logical combination of the carry in and the bit supplied to that stage of incrementation and the carry out is the logical AND.

The present inventive concept must be utilized in pairs but in most binary operations, a even number of bits is used per word and thus there is no penalty involved in using this approach to incrementing a digital word. In examining the operation of FIG. 2, it will be noted that if the carry in lead 30 is locked at a logic one while the leads 40 and 46 are also in a logic one condition, the SUM output will be logic zero at each of 38 and 52 while the carry out lead 54 will be a logic one. This would be logical since with all logic ones input as well as a carry input, the word being incremented would cause the device to overflow and thus have only a logic one for the carry output with the word incremented to the next numerical value which is all logic zeros. If on the other hand, either of the inputs 40 or 46 is logic zero or both of the inputs are a logic zero there will be no carry output. More specifically, if lead 40 is a logic one and lead 46 is a logic zero, the output on 38 will be a logic zero and the output of 52 will be a logic one. Thus, even though a carry is applied from stage N, since there is a logic zero from stage (N+1), there should be no carry but rather just the carry from the previous stage being applied to output lead 52. In fact, an examination of bit values will establish that such a condition does exist. If on the other hand lead 40 is a logic zero and lead 46 is a logic one, there should be no carry input from stage N and each of the outputs 38 and 52 should be a logic one with no carry signal output on 54. Again, a close examination of the bit values in the circuit will illustrate such is the case. Finally, if the two inputs 40 and 46 are a logic zero, the carry in on lead 30 should be output on lead 38 as a logic one but there should be a logic zero on leads 52 and 54.

A bit by bit examination of the circuit does not indicate at first glance that the above indicated results will occur, and it is thus believed to be an inventive act which established that the unobvious results obtained can be used to accomplish the increment function since the NAND gate 32 provides a logic zero in the first two assumed logic bit configurations and a logic one in the last two assumed logic bit configurations.

If the circuitry of FIG. 2 is inserted in each of the blocks of FIG. 3, an incrementer of any bit length can be obtained and in fact an odd number of stages could be utilized if so desired by merely adding an inverter after the NAND gate of the first stage of a section to provide the carry out signal for the apparatus.

The carry in signal on lead 77 would normally be set at a logic one for a pure increment function with single precision words. However, for double precision words, the carry signal from an input stage might be selected to be input or in the instance of a NOP (operation instruction), a logic zero would be input on lead 77. Thus, block 75 selects the type of operation to be accomplished for the circuitry. The output lead 115 provides an overflow indication for single precision or alternately provides the carry if it is the first set of stages in a double precision (or multiple precision) type of binary word operation.

In normal operation for FIG. 3 a binary word is input on the leads labeled input from stage 1 to stage (N+1) and in accordance with the teachings of FIG. 2 every other bit is inverted in the parallel input path before being applied to the ripple carry series circuit in the horizontal path containing the NANDs and NORs. Thus, the stage delay in the parallel path is insignificant as compared to the total delay in the series path from right to left across the incrementer circuit. Therefore, any time delays in this series path are minimized. The SUM leads from bit position 1 (lead 85) to bit position (N+1) 113 lead provides the incremented value of the digital word input at the upper portion of FIG. 3 with lead (N+1) being the sign bit.

It should be noted by those skilled in the art that if the signals at one input of an exclusive OR circuit are inverted, the resulting combination circuit acts as an exclusive NOR circuit. Also, if both signals supplied to a NOR circuit are inverted before being NORed, the resultant combination is an AND circuit. If the above information is applied to FIG. 2, it will be noted that the N bit position stage comprises exclusive OR and NAND circuit operations while the (N+1) bit position stage provides exclusive NOR and AND circuit operation. Alternatively, this AND circuit operation could be described as a NORing of inverted carry and inverted data bit position signals since the output from NAND gate 32 is actually a carry input signal. Obviously, the inverter 48 inverts the data bit appearing on lead 46 and thus the signal actually received by NOR gate 42 is inverted. While the signal received by the (N+1) stage from NAND gate 32 is an inverse or carry signal, it is still a "carry signal" as received from a previous stage. Thus, as defined herein, a signal may be a "carry signal" whether or not it is presented in inverted logic format.

In summary, the present invention illustrates an approach to designing an incrementer circuit which incorporates the concept of alternately NANDing and NORing signals in the ripple carry path of a increment circuit so as to eliminate extra stages of time delay found in prior art implementations of incrementer circuits using negative or inverting gate type logic. Since other specific gates or approaches to implementing the present solution will be obvious to those skilled in the art, I wish to be limited not by the specific circuit illustrated but only by the scope of the appended claims wherein, I claim:

I claim:
1. Logic apparatus comprising, in combination:
carry input means for providing a carry input signal;
input means for providing N stage input signals and (N+1) stage input signals;
NAND gate means and first exclusive OR gate means, each including output means, connected to said carry input signal means and to said input means for receiving carry input signals and N stage input signals respectively;
N stage SUM output means connected to said output of said first exclusive OR gate means for providing N stage SUM output signals;
inverter means connected to said input signals means for receiving said (N+1) stage input signals and providing a logically inverted output therefrom at output means thereof;
NOR gate means connected to said NAND means and to said inverter means for logically NORing the inputs and providing a carry output signal at an output means thereof; and
second exclusive OR gate means connected to said inverter means and to said output of said NAND means for logically exclusively combining said inputs to provide an (N+1) stage SUM output signal.

2. The method of incrementing an N bit logic word comprising the steps of:
alternately NANDing and NORing carry input signals with stage bit signals in a ripple carry path;
inverting stage bit input signals for NOR bit stages; and
XORing carry and stage signals to provide stage SUM logic value output signals.

3. Apparatus for incrementing an N bit logic word comprising, in combination;
signal supply means for supplying N bit stages of logic bit value signals first means, including signal and carry input means, for logically NANDing inputs in alternate stages of said apparatus;

second means, including signal and carry input means, for logically NORing inputs in the remaining stages of said apparatus, a serial logic path being formed thereby;

third means connecting said first means and said second means together for supplying carry output signals from each bit stage to the carry input of the following bit stage;

fourth means, connected to said first means, for supplying a logic value input to said carry input means of the first stage of said apparatus;

means, for inverting the input signal from said signal supply means, connected to said signal supply means and to said signal input means for each of the stages including said second means; and means, connected to said first means and said second means, for exclusive ORing stage input signal logic values as applied to the serial logic path and carry input signals in each stage of the word to provide stage SUM logic value output signals.

4. The method of incrementing an n bit logic word comprising the steps of:

inverting alternately occurring bits in an n bit logic word;

serially NANDing the non-inverted inputs with carry input signals and outputting from the NANDing means a carry out signal for each of n/2 bit stages of said n bit logic word;

logically NORing the inverted logic bits with received carry out signals for each of the remaining bit stages; and exclusively ORing the signals being NANDed or NORed in an individual stage to form a SUM output signal for that stage in the incrementation process.

5. Apparatus for incrementing the logic value of a multiple bit word containing N bit stages comprising, in combination:

first means for inputting a signal representative of each bit of a multiple bit word to be incremented wherein every other bit in increasing numerical weight is inverted in logic value;

second means, connected to said first means and to a logically previous stage in the apparatus, for logically NANDing the non-inverted bits with a carry input from the logically previous stage for supplying a carry output signal;

third means, connected to said first means and to said second means, for logically NORing the inverted input bits with the received carry input signal for that stage and providing a carry output for use in an immediately subsequent bit stage; and fourth means for exclusively combining the logic values of each of the signals supplied to the NAND or NOR means for each stage to provide as an output a logic value for that associated bit position of the incremented word.

6. Apparatus as claimed in claim 5 wherein the exclusive logic combining is an exclusive OR function.

7. The method of incrementing a multiple bit digital word comprising the steps of:

exclusive ORing each of a multiplicity of alternate bit positions of a word to be incremented with carry signals from associated logically previous stages to provide data bit position output signals;

exclusive NORing each of the remaining bit positions of the word to be incremented with carry signals from associated logically previous stages to provide data bit position output signals;

NANDing each set of signals exclusively ORed for providing carry signals to a subsequent stage; and ANDing each set of signals exclusively NORed for providing carry signals to a subsequent stage.

8. The method of incrementing a digital word comprising a plurality of data bit positions comprising the steps of:

exclusive ORing data bits from each alternate one of said plurality of data bit positions of a word to be incremented with carry signals from associated logically previous stages to provide data bit position output signals representative in bit position of the data bits input to be exclusively ORed;

exclusive NORing data bits received from remaining bit positions of the word to be incremented with carry signals from the previous stage to provide corresponding data bit position output signals;

NANDing each set of signals exclusively ORed for providing carry signals to a subsequent data bit position stage; and NORing signals supplied to each bit position stage, having an exclusive NORing step, after inversion of the data signal for providing carry signals to a subsequent data bit position stage.

9. Apparatus for incrementing a digital word comprising, in combination:

means for providing data bit signals representative of adjacent first and second data bit positions of a word to be incremented;

means for supplying a first serial path signal which serial path signal acts as a carry signal;

means for exclusive ORing said serial path signal with said first data bit position signal to provide a first stage output signal;

means for NANDing the signals exclusively ORed to provide a second serial path signal;

means for exclusive NORing the second data bit position signal with the second serial path signal for providing a second stage output signal in a word to be incremented; and means for ANDing the signals exclusively NORed to provide a third serial path signal.

* * * * *